United States Patent
Hu et al.

(10) Patent No.: US 6,796,414 B2
(45) Date of Patent: Sep. 28, 2004

(54) HIGH CAPACITY ONE-WAY CLUTCH ASSEMBLY

(75) Inventors: Fuzheng Hu, Toronto (CA); Derek Anderson, Mississauga (CA); David Mark Pascoe, Newmarket (CA); Cheng Mu, Toronto (CA)

(73) Assignee: Tesman International Inc., Concord (CA)

( * ) Notice: Subject to any disclaimer, the term of this patent is extended or adjusted under 35 U.S.C. 154(b) by 0 days.

(21) Appl. No.: 10/199,705

(22) Filed: Jul. 19, 2002

(65) Prior Publication Data

US 2003/0034218 A1 Feb. 20, 2003

Related U.S. Application Data

(60) Provisional application No. 60/306,755, filed on Jul. 19, 2001.

(51) Int. Cl.[7] ............................................. F16D 41/067
(52) U.S. Cl. ..................................... 192/45; 188/82.84
(58) Field of Search ......................... 192/45; 188/82.84

(56) References Cited

U.S. PATENT DOCUMENTS

| 3,760,914 A | * | 9/1973 | Gelbrich ...................... 192/45 |
| 4,354,585 A | * | 10/1982 | Ritter ........................... 192/45 |
| 4,422,537 A | * | 12/1983 | Ritter et al. ................... 192/45 |
| 6,543,592 B2 | * | 4/2003 | Hori ............................. 192/45 |

FOREIGN PATENT DOCUMENTS

GB           2073339 A   * 10/1981   ........... F16D/41/06

* cited by examiner

*Primary Examiner*—Richard M. Lorence
(74) *Attorney, Agent, or Firm*—Clark Hill PLC

(57) ABSTRACT

A clutch assembly for selectively engaging and disengaging two rotating members in a transmission. The clutch assembly includes an inner ring defining an outer diameter and an outer ring defining an inner diameter that is greater than the outer diameter of the inner ring. A plurality of rings extend through the clutch assembly between the inner diameter of the outer ring and the outer diameter of the inner ring. The plurality of rings provides selective locking engagement between the inner and outer rings. The clutch assembly also includes a cage for maintaining each of said plurality of rollers in position with respect to said inner and outer rings.

24 Claims, 8 Drawing Sheets

HIGH CAPACITY ONE-WAY CLUTCH ASSEMBLY

RELATED APPLICATIONS

This application claims priority to and all the benefits of U.S. provisional application No. 60/306,755, filed on Jul. 19, 2001.

FIELD OF THE INVENTION

The invention relates to clutch assemblies for motor vehicles. More particularly, the invention relates to a one-way clutch assembly having a high capacity design.

DESCRIPTION OF THE RELATED ART

One-way clutch assemblies are commonly found in drive-train systems such as motor vehicle transmissions, transfer cases, and differentials. Typically, one-way clutch assemblies include a plurality of rollers or sprags positioned between a clutch outer ring and a clutch inner ring. A one-way clutch assembly is able to rotate in one direction relative to the clutch outer and inner rings. But when the one-way clutch assembly rotates in the other directions, the clutch outer and inner rings will lock against each other due to binding action of the rollers thereon.

One-way clutch assemblies typically include ribbon springs for maintaining the rollers or sprags in position. The ribbon springs are positioned between each of the plurality of rollers or sprags, and are bounded by the clutch outer ring and the clutch inner ring. But due to the amount of space required to accommodate the ribbon springs inside the clutch assembly, only a limited number of rollers or sprags can be positioned inside the clutch assembly. The capacity of the one-way clutch assembly is further limited by the hertz stress between the clutch inner and outer rings, and the rollers or sprags.

SUMMARY OF THE INVENTION

Accordingly, there is provided a clutch assembly selectively engages and disengages two rotating members. The clutch assembly includes an inner ring defining an outer diameter and an outer ring defining an inner diameter that is greater than the outer diameter of the inner ring. A plurality of rollers extends through the clutch assembly between the inner diameter of the outer ring and the outer diameter of the inner ring. The plurality of rollers provides selective locking engagement between the inner and outer rings. The clutch assembly also includes a cage for maintaining each of said plurality of rollers in position with respect to the inner and outer rings.

BRIEF DESCRIPTION OF THE DRAWINGS

Advantages of the invention will be readily appreciated as the same becomes better understood by reference to the following detailed description when considered in connection with the accompanying drawings, wherein.

DETAILED DESCRIPTION OF THE PREFERRED EMBODIMENTS

Figure 1:
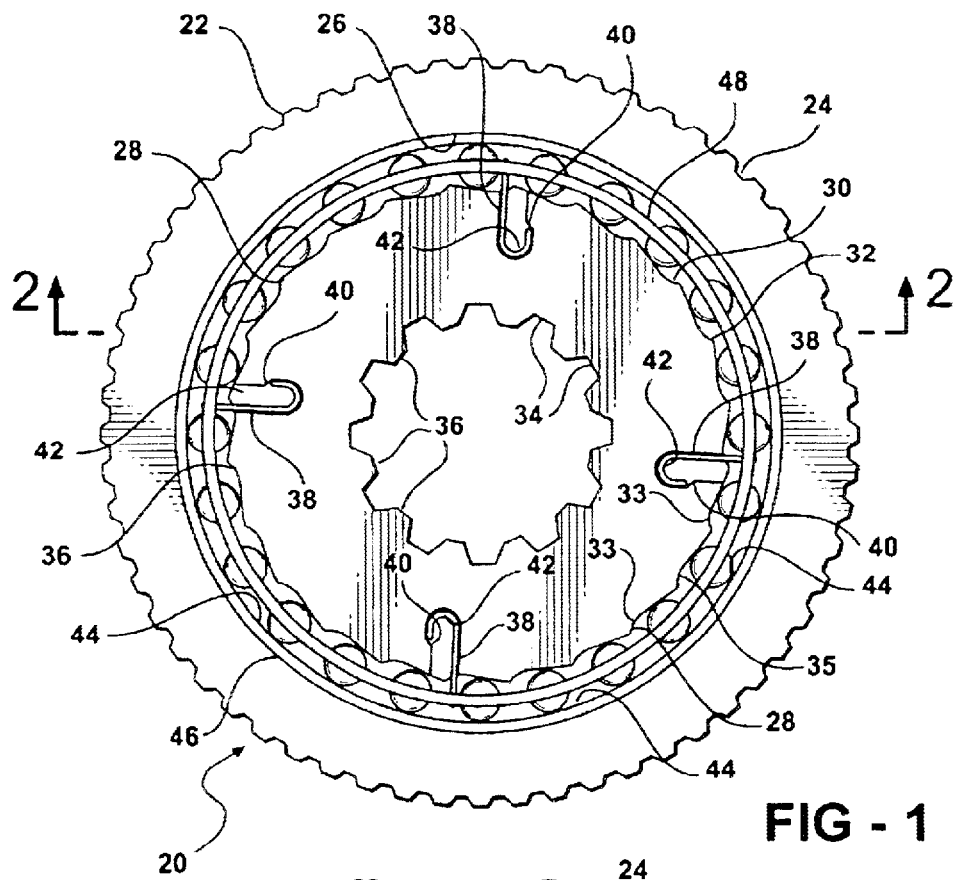
FIG. 1 is a top view of one embodiment of the invention.

Referring to the Figures, wherein like elements in various embodiments are offset from each other by multiples of one hundred, a clutch assembly is generally indicated at 20. The clutch assembly 20 selectively transfers power created by an internal combustion engine to wheels of a motor vehicle (none shown). The clutch assembly 20 is a high capacity one-way clutch 20.

The clutch assembly 20 includes an outer ring 22. The outer ring 22 acts as a torque reaction member and holds the clutch assembly 20 together. The outer ring 22 includes an outer ring spline 24 extending around a periphery thereof. The outer ring 22 defines an inner diameter 26.

Figure 2:
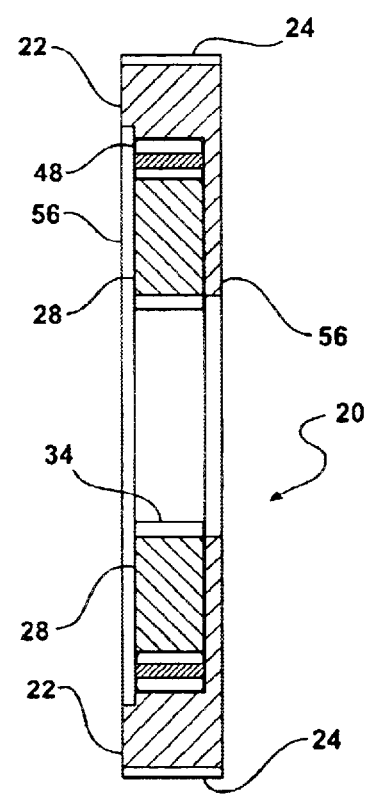
FIG. 2 is a cross-sectional side view taken along line 2—2 of FIG. 1.
Figure 3:
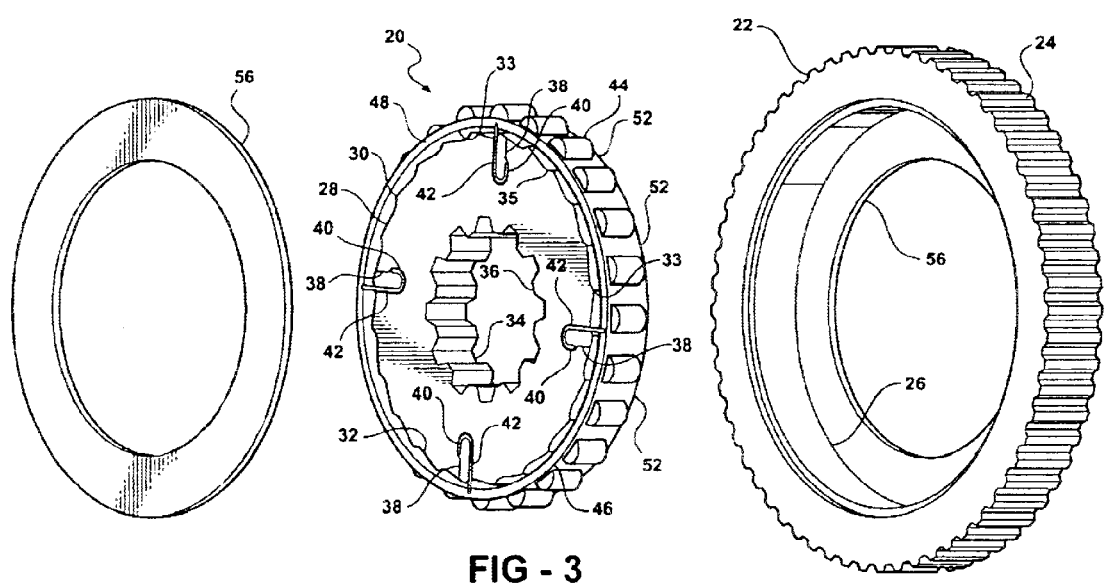
FIG. 3 is an exploded, perspective view of the first embodiment of the invention.

The clutch assembly 20 also includes an inner ring 28. The inner ring 28 has an outer diameter 30 that is smaller than the inner diameter 26 of the outer ring 22. As a result, the inner ring 28 as able to fit within the outer ring 22. The outer diameter 30 of the inner ring 28 is divided into multiple non-linear sections or cams 32. Each of the non-linear sections or cams 32 defines a shallow portion 33 and a deep portion 35. The inner ring 28 also has an inner diameter 34 that defines an inner ring spline 36. In a first embodiment of the invention (shown in FIGS. 1–3), the inner ring 28 defines spring receiving recesses 38. Each of the spring receiving recesses 38 extends inwardly from the outer diameter 30 of the inner ring 28 toward the inner diameter 34 thereof. In addition, each of the spring receiving recesses 38 defines a spring locking edge 40 for retaining a spring 42 therein. The spring 42 will be discussed in greater detail subsequently.

A plurality of rollers 44 extends between the inner diameter 26 of the outer ring 22 and the outer diameter 30 of the inner ring 28. When the plurality of rollers 44 is in the shallow portions 33 of the cams 32, the plurality of rollers 44 lock the inner ring 28 to the outer ring 22. Conversely, when the plurality of rollers 44 moves into the deep portions 35 of the cam 32, the plurality of rollers 44 disengages the inner ring 28 from the outer ring 22. Movement of the plurality of rollers 44 is dictated by the direction of rotation of the outer ring 22. More specifically, if the outer ring 22 rotates clockwise (when viewed from the perspective of FIG. 1), the plurality of rollers 44 rolls into the deep portions 35 of the cams 32, causing frictional disengagement of the outer ring 22 and the inner ring 28. And if the outer ring 22 is rotated counter-clockwise (when viewed from the perspective of FIG. 1), the plurality of rollers 44 rolls into the shallow portions 33 of the cams 32, causing frictional engagement of the outer ring 22 with the inner ring 28.

The clutch assembly 20 also includes a cage 46, which maintains the position of the plurality of rollers 44 with respect to the outer 22 and inner 28 rings. The cage 46 is held along the inner ring 28 by the plurality of springs 42 extending therefrom into the plurality of spring receiving recesses 38. The cage 46 includes side rings 48 and a plurality of roller dividers 52 spaced between each of the plurality of rollers 44. The roller dividers 52 ensure that two of the plurality of rollers 44 does not occupy the same cam 32, which would cause the plurality of rollers 44 to jam. It can be seen that the cage 46 including the roller dividers 52 occupies only a small amount of space within the clutch assembly 20. As a result, the number of the plurality of rollers 44 in the clutch assembly 20 is increased, and the hertz stress level on the plurality of rollers is reduced.

Side plates 56 extend over both sides of the inner ring 28 to position the inner ring 28 with respect to the outer ring 22, and to protect the plurality of rollers 44 from the surrounding environment.

Figure 4:
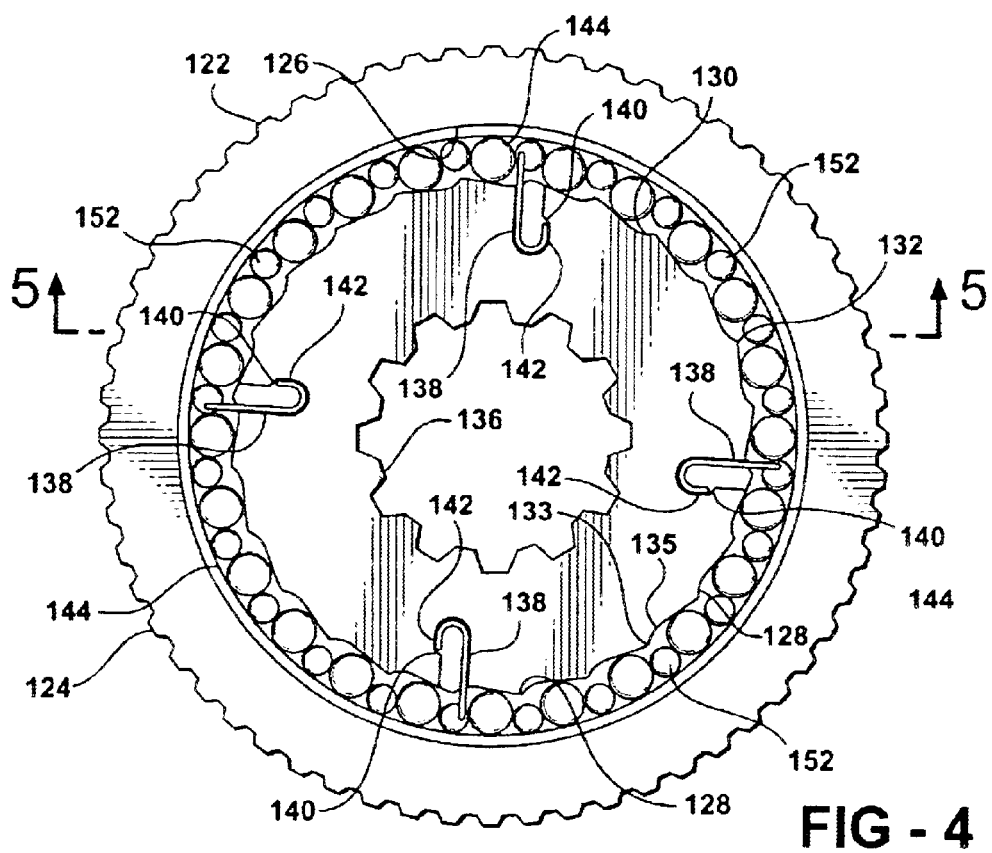
FIG. 4 is a top view of a second embodiment of the invention.
Figure 5:
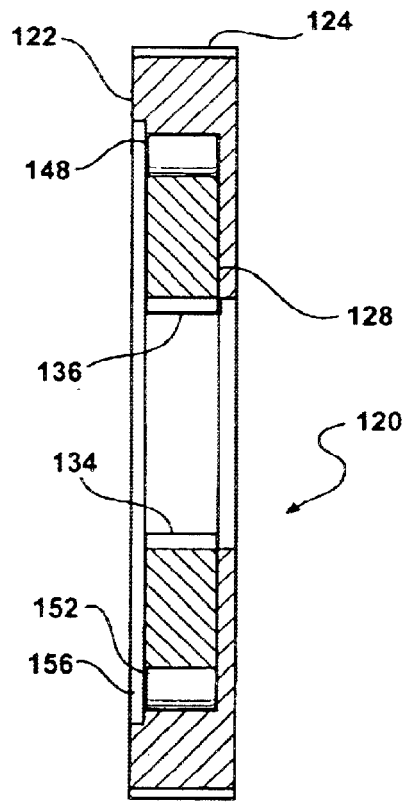
FIG. 5 is a cross-sectional side view taken along line 5—5 of FIG. 4.
Figure 6:
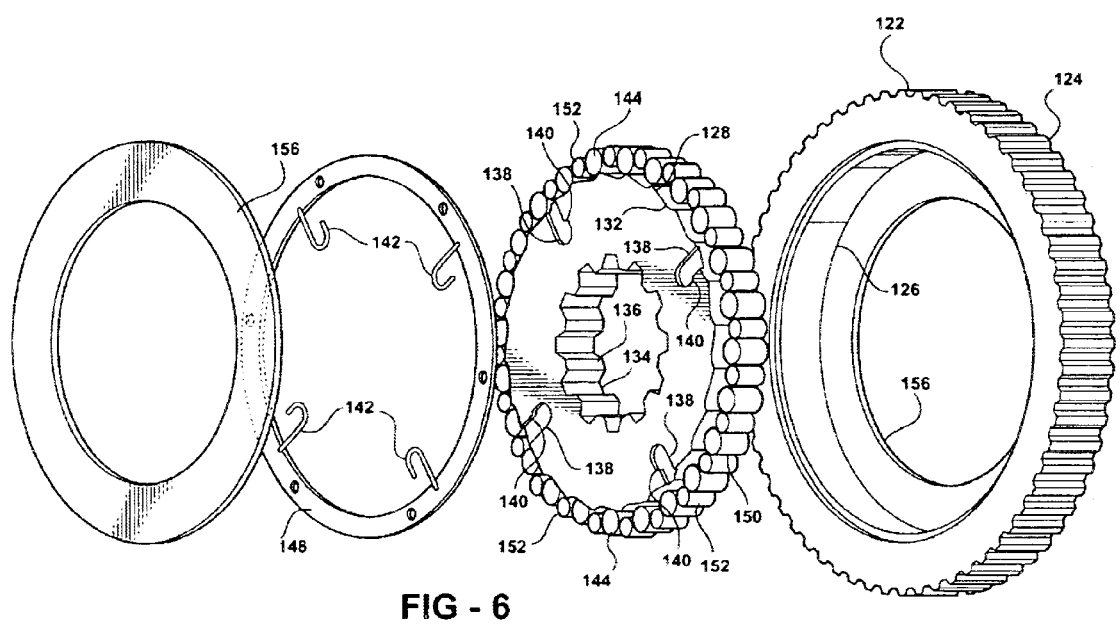
FIG. 6 is an exploded, perspective view of the second embodiment of the invention.

In the first embodiment the invention, the plurality of roller dividers 52 include intermediate planar segments 52 that fill space between each of the plurality of rollers 44. The intermediate planar segments 52 are sized to prevent two of the plurality of rollers from occupying the same cam 32. In a second embodiment of the invention (shown in FIGS. 4–6), the roller dividers 152 are smaller rollers spaced between each of the plurality of rollers 144. As with the intermediate segment 52, the smaller rollers 152 occupy an amount of space between each adjacent rollers of the plurality of rollers 144 to prevent two of the plurality of rollers 144 to occupy the same cam 132.

Also with reference to the second embodiment of the invention, the plurality of springs 142 is secured to the side ring 148. The side ring 148 is aligned with the inner ring 128 so that the plurality of springs 142 fit into the plurality of spring receiving recesses 138. In addition, the side ring 148, along with the side plates 156, maintains the inner ring 128 within the outer ring 122.

Figure 7:
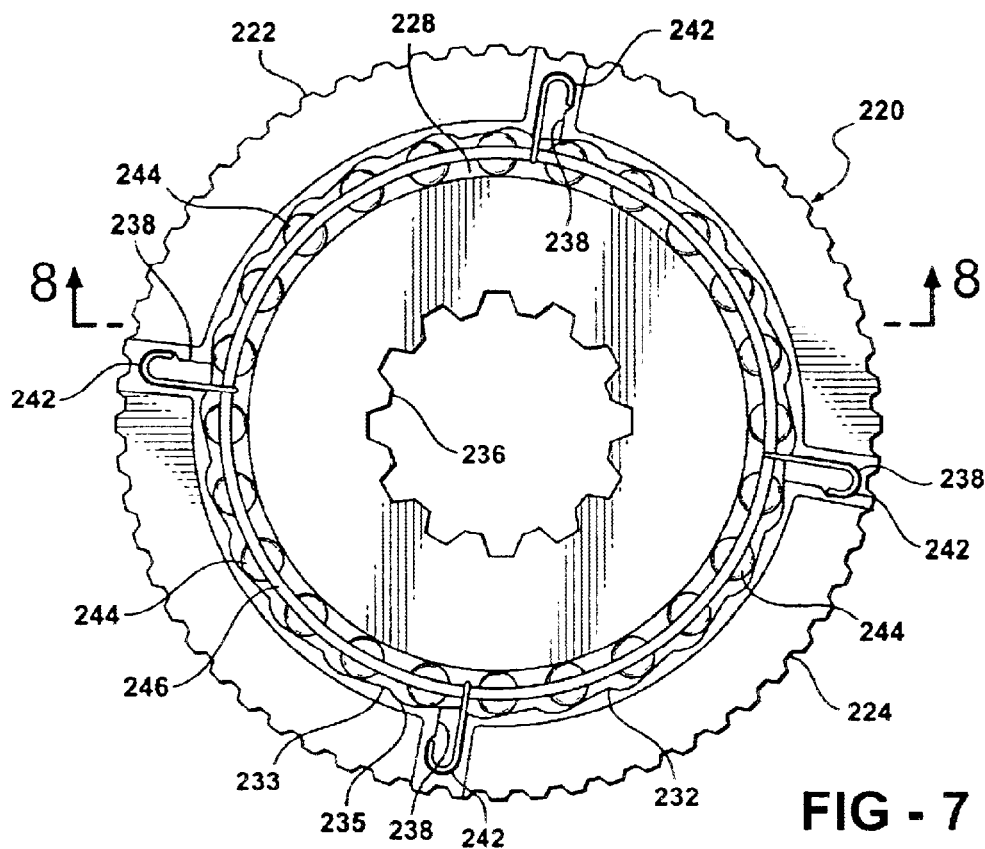
FIG. 7 is a top view of a third embodiment of the invention.
Figure 8:
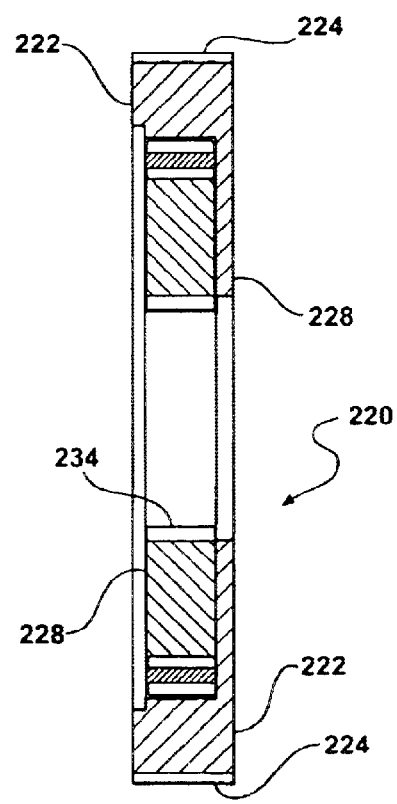
FIG. 8 is a cross-sectional side view taken along line 8—8 of FIG. 7.
Figure 9:
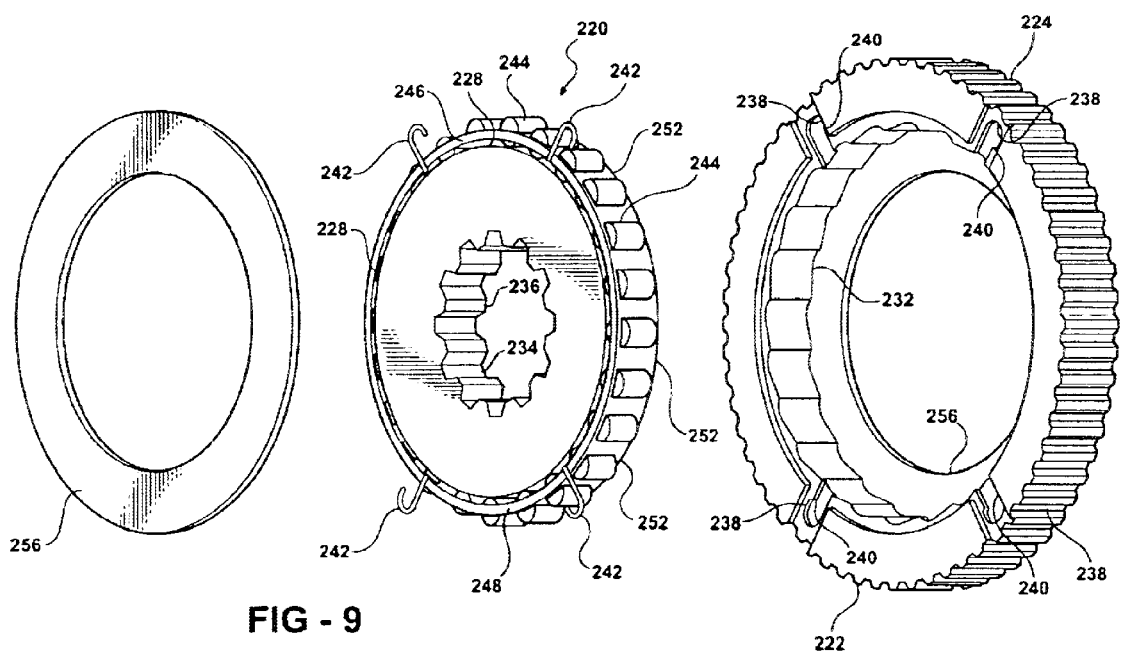
FIG. 9 is an exploded, perspective view of the third embodiment of the invention.

In a third embodiment of the invention (shown in FIGS. 7–9), the outer ring 222 defines the plurality of spring receiving recesses 238, and the cams 232 are formed along the inner diameter 226 of the outer ring 222. Thus, rotation of the inner ring 228 will dictate whether the inner ring 228 is in locking engagement with the outer ring 222. The plurality of roller dividers 252 is intermediate segments 252 that fill the space between each of the plurality of rollers 244.

Figure 10:
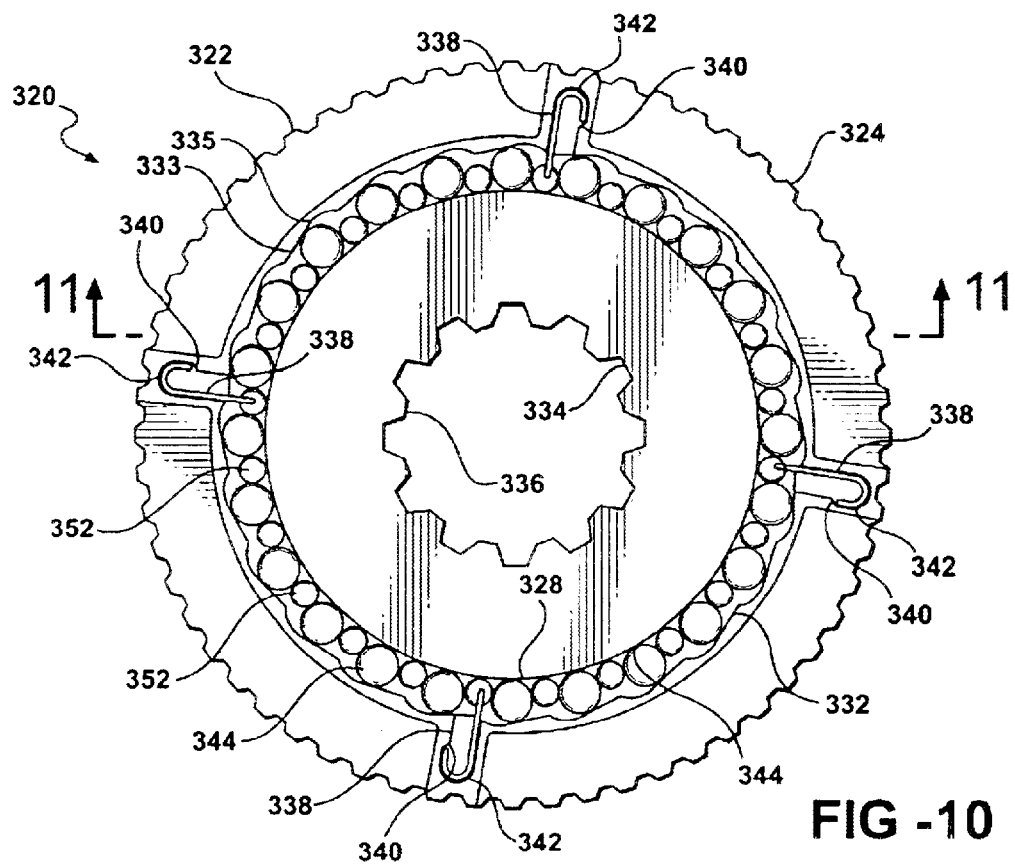
FIG. 10 is a top view of a fourth embodiment of the invention.
Figure 11:
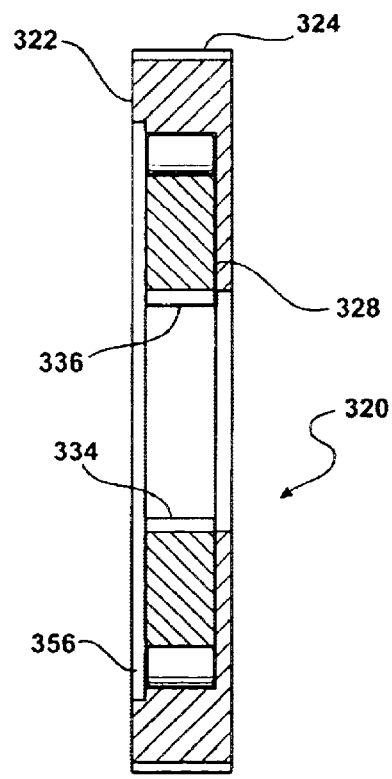
FIG. 11 is a cross-sectional side view taken along line 11—11 of FIG. 10.
Figure 12:
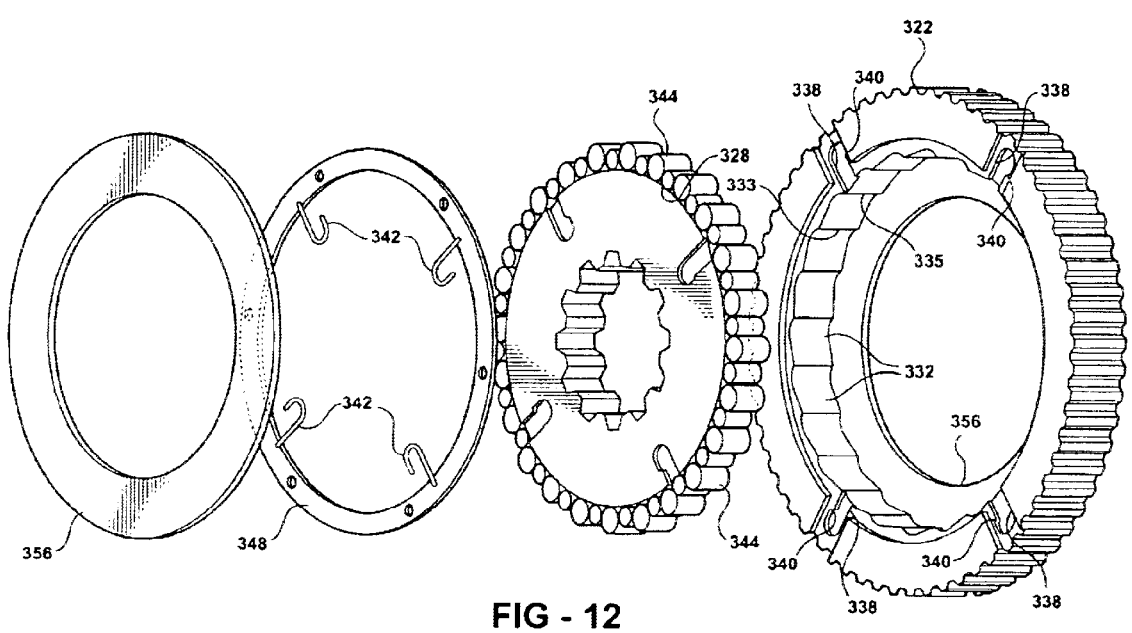
FIG. 12 is an exploded, perspective view of the fourth embodiment of the invention.

In a fourth embodiment of the invention (shown in FIGS. 10–12), the outer ring 322 defines the plurality of spring receiving recesses 338. The plurality of springs 342 are secured to the side ring 348, which maintains the inner ring 328 within the outer ring 322. The plurality of roller dividers 352 is the plurality of smaller rollers 352, which are spaced between each of the plurality of rollers 344.

The invention has been described in an illustrative manner. It is to be understood that the terminology, which has been used, is intended to be in the nature of words of description rather than of limitation. Many modifications and variations of the invention are possible in light of the above teachings. Therefore, within the scope of the appended claims, the invention may be practiced other than as specifically described.

What is claimed is:

1. A clutch assembly for selectively engaging and disengaging two rotating members, said clutch assembly comprising:

an inner ring defining an outer diameter having a plurality of cams extending about said outer diameter;

an outer ring defining an inner diameter greater than said outer diameter of said inner ring;

a plurality of rollers extending through said clutch assembly between said inner diameter of said outer ring and said outer diameter of said inner ring, said plurality of rollers providing selective locking engagement between said inner and outer rings; and a cage for maintaining each of said plurality of rollers in each of said plurality of cams reducing hertz stress for each of said plurality of rollers, wherein said cane includes a plurality of springs securing said cage to said inner ring.

2. A clutch assembly as set forth in claim 1 wherein said inner ring defines a plurality of spring receiving recesses for housing said plurality of springs.

3. A clutch assembly as set forth in claim 2 wherein each of said plurality of spring receiving recesses defines a spring lock edge.

4. A clutch assembly as set forth in claim 3 wherein said cage includes roller dividers separating each of said of rollers from each other.

5. A clutch assembly as set forth in claim 4 wherein said cage includes side rings for aligning said plurality of rollers in position with respect to said inner and outer rings.

6. A clutch assembly as set forth in claim 5 wherein said roller dividers are small rollers spaced between each of said plurality of rollers.

7. A clutch assembly as set forth in claim 5 wherein said roller dividers are intermediate planar segments spaced between each of said plurality of rollers.

8. A clutch assembly for selectively engaging and disengaging two rotating members, said clutch assembly comprising:

an inner ring defining an outer diameter having a plurality of cams extending about said outer diameter;

an outer ring defining an inner diameter greater than said outer diameter of said inner ring;

a plurality of rollers extending through said clutch assembly between said inner diameter of said outer ring and said outer diameter of said inner ring, said plurality of rollers providing selective locking engagement between said inner and outer rings; and a cage including roller dividers spaced between each of said plurality of rollers for maintaining said plurality of rollers in each of said plurality of cams reducing hertz stress for each of said plurality of rollers, wherein said cage includes a plurality of springs for securing said cage to said inner ring.

9. A clutch as set forth in claim 8 wherein said inner ring defines a plurality of spring receiving recesses for housing said plurality of springs.

10. A clutch assembly as set forth in claim 9 wherein each of said plurality of spring receiving recesses defines a spring lock edge.

11. A clutch assembly as set forth in claim 10 wherein said roller dividers are small rollers spaced between each of said plurality of rollers.

12. A clutch assembly as set forth in claim 10 wherein said roller dividers are intermediate planar segments spaced between each of said plurality of rollers.

13. A clutch assembly for selectively engaging and disengaging two rotating members, said clutch assembly comprising:

an outer ring defining an inner diameter having a plurality of cams extending about said outer diameter;

an inner ring defining an outer diameter smaller than said inner diameter of said outer ring;

a plurality of rollers extending through said clutch assembly between said inner diameter of said outer ring and said outer diameter of said inner ring, said plurality of rollers providing selective locking engagement between said inner and outer rings; and a cage for maintaining each of said plurality of rollers in each of said plurality of cams reducing hertz stress for each of said plurality of rollers, wherein said cage includes a plurality of springs securing said cage to said outer ring.

14. A clutch assembly as set forth in claim 13 wherein said outer ring defines a plurality of spring receiving recesses for housing said plurality of springs.

15. A clutch assembly as set forth in claim 14 wherein each of said plurality of spring receiving recesses defines a spring lock edge.

16. A clutch assembly as set forth in claim 15 wherein said cage includes roller dividers separating each of said plurality of rollers from each other.

17. A clutch assembly as set forth in claim 16 wherein said cage includes side rings for aligning said plurality of rollers in position with respect to said inner and outer rings.

18. A clutch assembly as set forth in claim 15 wherein said roller dividers are small rollers spaced between each of said plurality of rollers.

19. A clutch assembly as set forth in claim 16 wherein said roller dividers are intermediate planar segments spaced between each of said plurality of rollers.

20. A clutch assembly for selectively engaging and disengaging two rotating members, said clutch assembly comprising:

an outer ring defining an inner diameter having a plurality of cams extending about said inner diameter;

an inner ring defining an outer diameter smaller than said inner diameter of said outer ring;

a plurality of rollers extending through said clutch assembly between said inner diameter of said outer ring and said outer diameter of said inner ring, said plurality of rollers providing selective locking engagement between said inner and outer rings; and a cage including roller dividers spaced between each of said plurality of rollers for maintaining said plurality of rollers in each of said plurality of cams reducing hertz stress for each of said plurality of rollers, wherein said cage includes a plurality of springs for securing said cage to said outer ring.

21. A clutch assembly as set forth in claim 20 wherein said outer ring defines a plurality of spring receiving recesses for housing said plurality of springs.

22. A clutch assembly as set forth in claim 21 wherein each of said plurality of spring receiving recesses defines spring lock edge.

23. A clutch assembly as set forth in claim 22 wherein said roller dividers are small rollers spaced between each of said plurality of rollers.

24. A clutch assembly as set forth in claim 22 wherein said roller dividers are intermediate planar segments spaced between each of said plurality of rollers.

* * * * *

UNITED STATES PATENT AND TRADEMARK OFFICE
CERTIFICATE OF CORRECTION

PATENT NO. : 6,796,414 B2
DATED : September 28, 2004
INVENTOR(S) : Hu et al.

It is certified that error appears in the above-identified patent and that said Letters Patent is hereby corrected as shown below:

Column 4,
Line 8, "cane" should be -- cage --.
Line 18, between "said" and "of", please insert -- plurality --.
Line 47, between "clutch" and "as", please insert -- assembly --.

Column 5,
Line 24, "16", should be -- 15 --.

Signed and Sealed this

Fourteenth Day of June, 2005

JON W. DUDAS
*Director of the United States Patent and Trademark Office*